(12) United States Patent
Nagauchi (10) Patent No.: US 10,806,001 B2
(45) Date of Patent: Oct. 13, 2020

(54) SEMICONDUCTOR LIGHT SOURCE CONTROL APPARATUS CONTROLLING CURRENT FLOWING IN SEMICONDUCTOR LIGHT SOURCE, AND PROJECTION TYPE IMAGE DISPLAY APPARATUS

(71) Applicant: Panasonic Intellectual Property Management Co., Ltd., Osaka (JP)

(72) Inventor: Kensuke Nagauchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/601,634

(22) Filed: Oct. 15, 2019

(65) Prior Publication Data

US 2020/0120771 A1 Apr. 16, 2020

(30) Foreign Application Priority Data

Oct. 16, 2018 (JP) .................................. 2018-195185

(51) Int. Cl.
*H05B 45/20* (2020.01)
*G02B 26/00* (2006.01)
*G03B 21/20* (2006.01)
*H05B 45/40* (2020.01)
*H05B 47/16* (2020.01)

(52) U.S. Cl.
CPC ............ *H05B 45/20* (2020.01); *G02B 26/008* (2013.01); *G03B 21/204* (2013.01); *H05B 45/40* (2020.01); *H05B 47/16* (2020.01)

(58) Field of Classification Search
CPC ............ H05B 33/0821; H05B 33/0857; G02B 26/008; G03B 21/204
See application file for complete search history.

(56) References Cited

U.S. PATENT DOCUMENTS 10,136,489 B1 * 11/2018 Qiu ...................... H05B 33/086
2008/0204382 A1 8/2008 Lim et al.
(Continued)

FOREIGN PATENT DOCUMENTS

JP 2008-268890 11/2008
JP 2009-89115 4/2009
(Continued)

*Primary Examiner* — Alexander H Taningco
*Assistant Examiner* — Pedro C Fernandez
(74) *Attorney, Agent, or Firm* — Wenderoth, Lind & Ponack, L.L.P.

(57) ABSTRACT

A semiconductor light source control apparatus includes a semiconductor light source that emits light in accordance with a current, a detection resistor that generates a detection voltage by the current flowing in the semiconductor light source; and a power supply current control apparatus that controls the current flowing in the semiconductor light source based on the detection voltage. The semiconductor light source control apparatus pulse-width-modulates (PWM) the current flowing in the semiconductor light source for respective ones of a plurality of color intervals to adjust brightness and color tone of output light from the semiconductor light source. An amplitude of the current flowing in the semiconductor light source is controlled only in a predetermined color interval when a duty value of the PWM is maximum.

3 Claims, 6 Drawing Sheets (56) References Cited

U.S. PATENT DOCUMENTS

| | | | | |
|---|---|---|---|---|
| 2009/0302779 | A1* | 12/2009 | McKinney | H05B 45/37 315/294 |
| 2010/0045195 | A1* | 2/2010 | Yamamuro | H02M 3/33507 315/219 |
| 2010/0219764 | A1* | 9/2010 | Yamasaki | H05B 45/37 315/224 |
| 2011/0026580 | A1* | 2/2011 | Deurenberg | H03K 7/08 375/238 |
| 2012/0086701 | A1* | 4/2012 | Vaananen | H05B 45/14 345/214 |
| 2014/0293371 | A1* | 10/2014 | Kurokawa | H04N 1/042 358/475 |
| 2015/0116379 | A1* | 4/2015 | Lim | G09G 3/3406 345/691 |
| 2016/0073473 | A1* | 3/2016 | Fang | H05B 45/395 315/224 |
| 2016/0113085 | A1* | 4/2016 | Vaananen | G09G 3/36 315/185 R |
| 2017/0188420 | A1* | 6/2017 | Kido | H04B 10/116 |

FOREIGN PATENT DOCUMENTS

| | | |
|---|---|---|
| JP | 2010-49523 | 3/2010 |
| JP | 2018-54667 | 4/2018 |

* cited by examiner

SEMICONDUCTOR LIGHT SOURCE CONTROL APPARATUS CONTROLLING CURRENT FLOWING IN SEMICONDUCTOR LIGHT SOURCE, AND PROJECTION TYPE IMAGE DISPLAY APPARATUS

BACKGROUND OF THE INVENTION

1. Field of the Invention

The present disclosure relates to a semiconductor light source control apparatus for controlling a current flowing in a semiconductor light source, and a projection type image display apparatus including the semiconductor light source control apparatus.

2. Description of Related Art

Patent Document 1 provides a projection type image display apparatus equipped with a light source apparatus enabling improvement in chromaticity of blue component light. In the projection type image display apparatus, S-polarized blue component light from a light source unit is converted into circularly polarized light, and then, incident on a phosphor wheel. The phosphor wheel reflects a part of the incident blue component light, and transmits a residual thereof. The reflected blue component light is converted into P-polarized light. With the transmitted blue component light, a phosphor film of the phosphor wheel emits emission light including blue component light. As a result, a color gamut including sRGB (standard Red Green Blue) is realized by mixing the converted P-polarized blue component light and the emitted emission light.

PRIOR ART DOCUMENT

Patent Document

Patent Document 1: Japanese Patent Laid-open Publication No. JP2018-54667A.

SUMMARY OF THE INVENTION

The present disclosure provides a semiconductor light source control apparatus can easily control the current flowing in the semiconductor light to establish stable and highly reliable drive of the light source, and provides a projection type image display apparatus including the same semiconductor light source control apparatus.

According to the present disclosure, there is provided a semiconductor light source control apparatus including a semiconductor light source that emits light in accordance with a current; a detection resistor that generates a detection voltage by the current flowing in the semiconductor light source; and a power supply current control apparatus that controls the current flowing in the semiconductor light source based on the detection voltage. The semiconductor light source control apparatus pulse-width-modulates (PWM) the current flowing in the semiconductor light source for respective ones of a plurality of color intervals to adjust brightness and color tone of output light from the semiconductor light source. An amplitude of the current flowing in the semiconductor light source is controlled only for a predetermined color interval when a duty value of the PWM is maximum.

According to the present disclosure, the current flowing in the semiconductor light source can be easily controlled to establish stable and highly reliable drive of the light source.

EMBODIMENTS

Embodiments will be described in detail below with reference to the drawings as appropriate. However, a description more detailed than necessary may be omitted. For example, a detailed description of an already well-known matter and a redundant description on substantially the same configuration may be omitted. This is to avoid the unnecessary redundancy of the following description and to facilitate understanding of those skilled in the art.

It is noted that the inventor(s) provide(s) the accompanying drawings and the following description in order to enable those skilled in the art to sufficiently understand the present disclosure, which is not intended to limit the claimed subject matter.

First Embodiment

Hereinafter, the first embodiment will be described with reference to FIGS. 1 to 7.

1-1. Configuration

Figure 1:
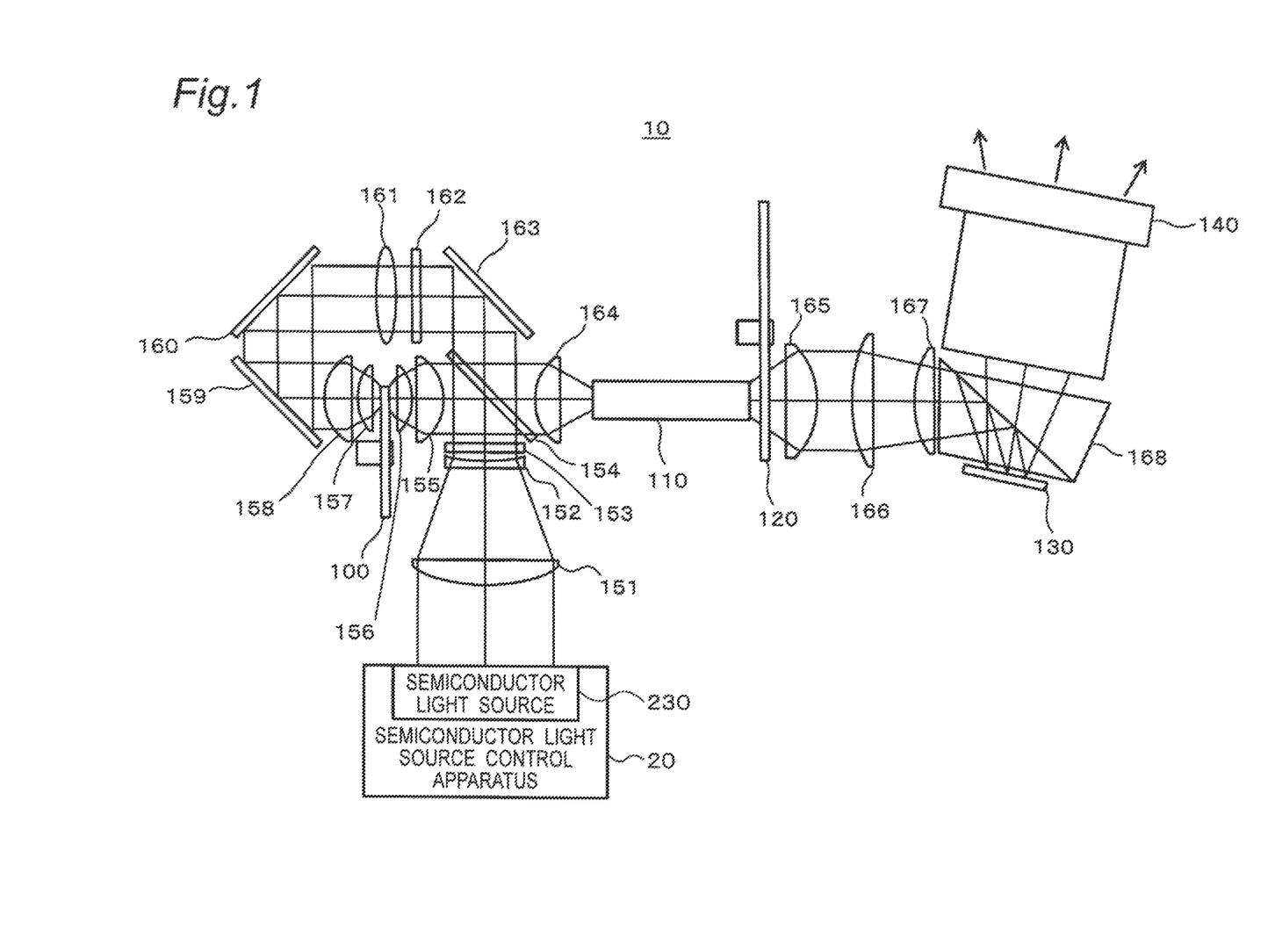
FIG. 1 is a block diagram showing a configuration example of a projection type image display apparatus 10 according to a first embodiment.

FIG. 1 is a block diagram showing a configuration example of a projection type image display apparatus 10 according to a first embodiment. Referring to FIG. 1, the projection type image display apparatus 10 is configured to include a semiconductor light source control apparatus 20, a phosphor wheel 100, a rod integrator 110, a color wheel 120, a digital mirror device (DMD) 130, and a projection lens 140.

Referring to FIG. 1, the semiconductor light source control apparatus 20 controls a semiconductor light source 230 such as a laser light source to emit blue laser light. The blue laser light passes through lenses 151 and 152 and a diffusion plate 153, and then, is reflected by a dichroic mirror 154, collected by lenses 155 and 156, and incident on the phosphor wheel 100. The phosphor wheel 100 converts the wavelength of the incident blue laser light with selectively switching over the characteristics sequentially in a time-division manner, and then, outputs a color-converted laser light.

The output light of the phosphor wheel 100 is transmitted through lenses 157 and 153, collimated, reflected by mirrors 159 and 160, transmitted through a lens 161 and a diffusion plate 162, and then, is reflected by a mirror 163 and the dichroic mirror 154. The reflected light is collected by a lens 164, and is then incident on the rod integrator 110.

The rod integrator 110 is a solid rod made of a transparent member such as glass. The rod integrator 110 uniforms the light incident from the phosphor wheel 100, and outputs the light to the color wheel 120. It is noted that the rod integrator 110 may be a hollow rod with its inner wall formed of a mirror surface. The color wheel 120 filters the light from the rod integrator 110 with selectively switching over the characteristics sequentially in a time-division manner, and then, outputs a filtered light.

The light converted by the color wheel 120 is incident on the DMD 130 through lenses 165, 166 and 167, and an internal total reflection prism 168. The DMD 130 is configured to include a plurality of minute mirrors, and the minute mirrors are movable. Each of the minute mirrors corresponds to one pixel, and whether or not to reflect the light toward the projection lens 140 is switched over based on information of the pixel of an image signal. As a result, the light from the color wheel 120 is modulated based on the image signal. The image light modulated by the DMD 130 is incident on the projection lens 140 through the internal total reflection prism 168. The projection lens 140 enlarges and projects the modulated image light onto a screen (not shown).

Figure 2:
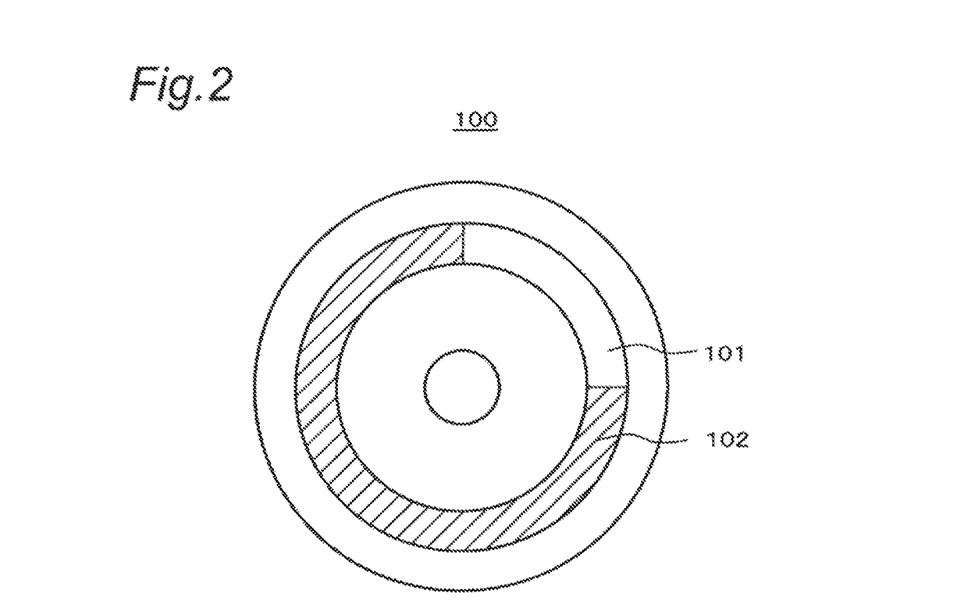
FIG. 2 is a plan view showing a configuration example of a phosphor wheel 100 in the projection type image display apparatus 10 of FIG. 1.

FIG. 2 is a plan view showing a configuration example of the phosphor wheel 100. The phosphor wheel 100 includes a transmission region 101 and a yellow region 102 that are each formed with a predetermined width in a radial direction so as to divide the region along a circumference of the phosphor wheel 100. The phosphor wheel 100 is driven and rotated by a motor or the like, to color-convert and output a converted incident light while sequentially and selectively switching over the regions 101 and 102 that receive the blue light from the semiconductor light source 230.

Figure 3:
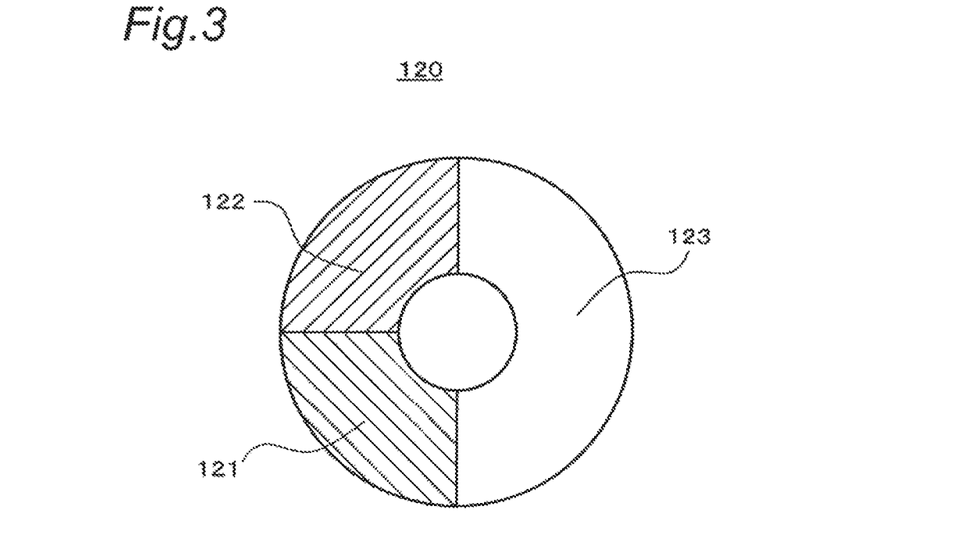
FIG. 3 is a plan view showing, a configuration example of a color wheel 120 in the projection type image display apparatus 10 of FIG. 1.

FIG. 3 is a plan view showing a configuration example of the color wheel 120. The color wheel 120 includes a red filter region 121, a green filter region 122, and a transmission region 123, which are formed so as to divide the surface along the circumference of the color wheel 120 in the radial direction. The color wheel 120 is driven and rotated by a motor or the like, to color-convert and output a converted incident light while sequentially and selectively switching over the regions 121 to 123 that receive the light from the rod integrator 110.

Figure 4:
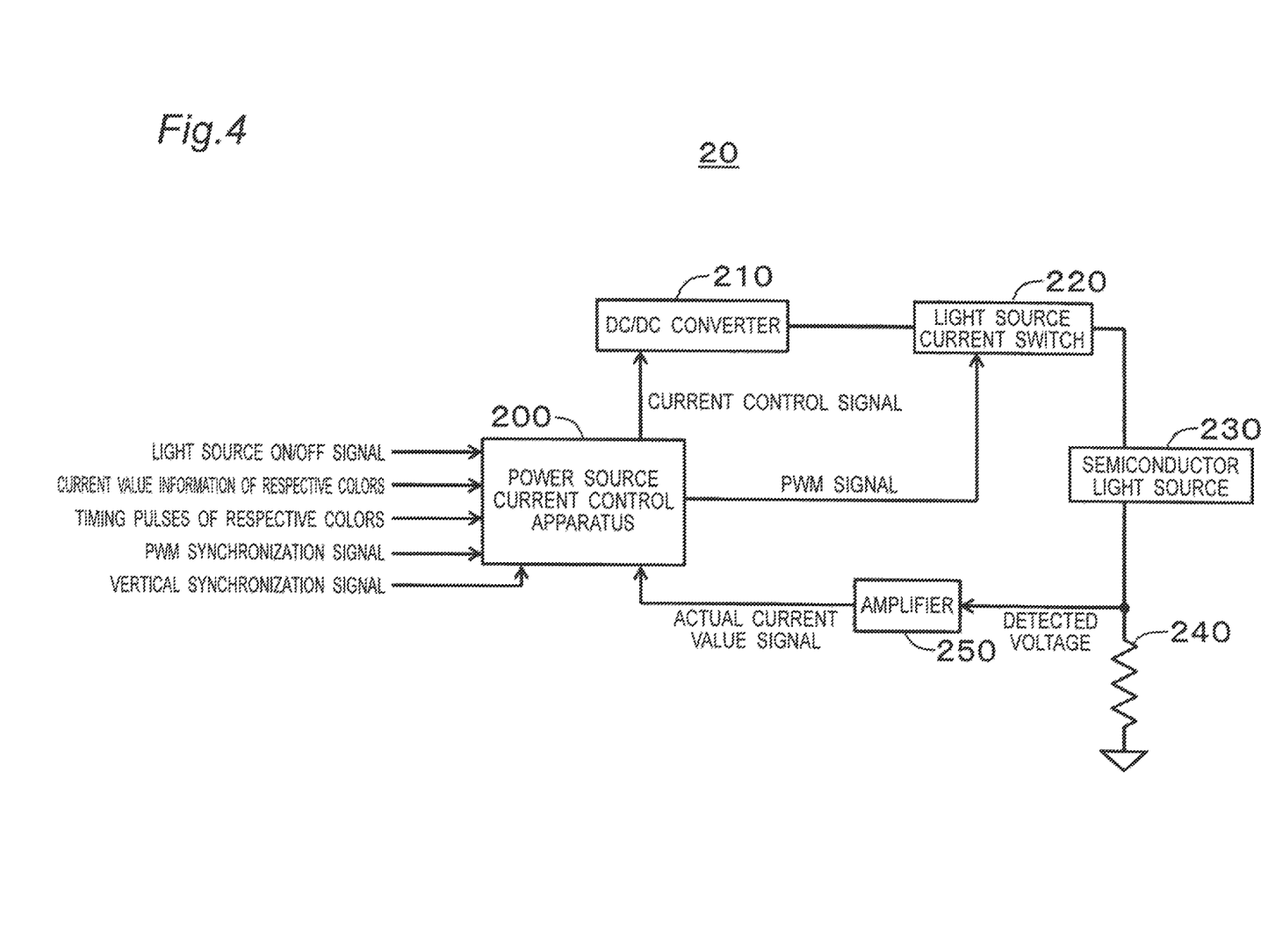
FIG. 4 is a block diagram showing a configuration example of a semiconductor light source control apparatus 20 in the projection type image display apparatus 10 of FIG. 1.

FIG. 4 is a block diagram showing a configuration example of the semiconductor light source control apparatus 20 in the projection type image display apparatus 10 of FIG. 1. Referring to FIG. 4, the semiconductor light source control apparatus 20 is configured to include a power supply current control apparatus 200, a DC/DC converter 210, a light source current switch 220, a semiconductor light source 230, a detection resistor 240, and an amplifier 250.

Referring to FIG. 4, the power supply current control apparatus 200 inputs a light source on/off sigma from an external circuit, current value information of respective colors, timing pulses of respective colors, a PWM synchronization signal, a vertical synchronization signal, and an actual current value signal from the amplifier 250. The power supply current control apparatus 200 executes a current value control process of FIG. 7 to be described later in synchronization with the input vertical synchronization signal. Hence, the power supply current control apparatus 200 generates a current, control signal to drive and control the DC/DC converter 210. In addition, the power supply current control apparatus 200 generates a PWM signal so that the duty value becomes equal to a duty value determined by the current value control process of FIG. 7, to control the light source current switch 220 to be turned on/off on in synchronization with the PWM synchronization signal. That is, the brightness and color tone (referring to color tone, including lightness and saturation) are adjusted by the PWM. However, the power supply current control apparatus 200 generates the PWM signal so that the PWM signal is always turned off while the input light source on/off signal is turned off.

The DC/DC converter 210 generates a current, which is to flow in the semiconductor light source 230 in accordance with the current control signal from the power supply current control apparatus 200. At this time, the DC/DC converter 210 is controlled with a current value determined by the current value control process, and thus generates the current, so that the current flowing in the semiconductor light source 230 becomes equal to a target current (amplitude) value. The light source current switch 220 switches over on/off of conduction thereof in accordance with the PWM signal from the power supply current control apparatus 200. Hence, the conduction/disconnection of the current flowing from the DC/DC converter 210 to the semiconductor light source 230 is switched over.

The semiconductor light source 230 is, for example, a blue laser light source and emits blue laser light with an intensity corresponding to a value of a flowing current. A current generated by the DC/DC converter 210 and subjected to on/off modulation by the light source current switch 220 is allowed to flow in the semiconductor light source 230, so that the output light of the semiconductor light source 230 is pulse width-modulated (PWM). The detection resistor 240 generates a detection voltage with the current flowing in the semiconductor light source 230. Since this detection voltage is usually a small value (for example, several mV), the detection voltage is difficult to detect and reflect accurately as it is. Therefore, the amplifier 250 amplifies the detection voltage generated by the detection resistor 240, and outputs an amplified voltage to the power supply current control apparatus 200 as an actual current value signal.

1-2. Operation

The operation of each of the projection type image display apparatus 10 and the semiconductor light source control apparatus 20 configured as described above will be described below.

1-2-1. Operation of Projection Type Image Display Apparatus

In the projection type image display apparatus 10 of FIG. 1, one frame of image is displayed for each frame obtained by dividing one second into 60 in synchronization with the vertical synchronization signal. Each frame is divided into three sub-frames, and each sub-frame is further divided into four color intervals of a green (G) interval, a red (R) interval, a blue (B) interval, and a yellow (Ye) interval. In each color interval, the corresponding color component of the image of the sub-frame is projected and displayed.

Figure 5:
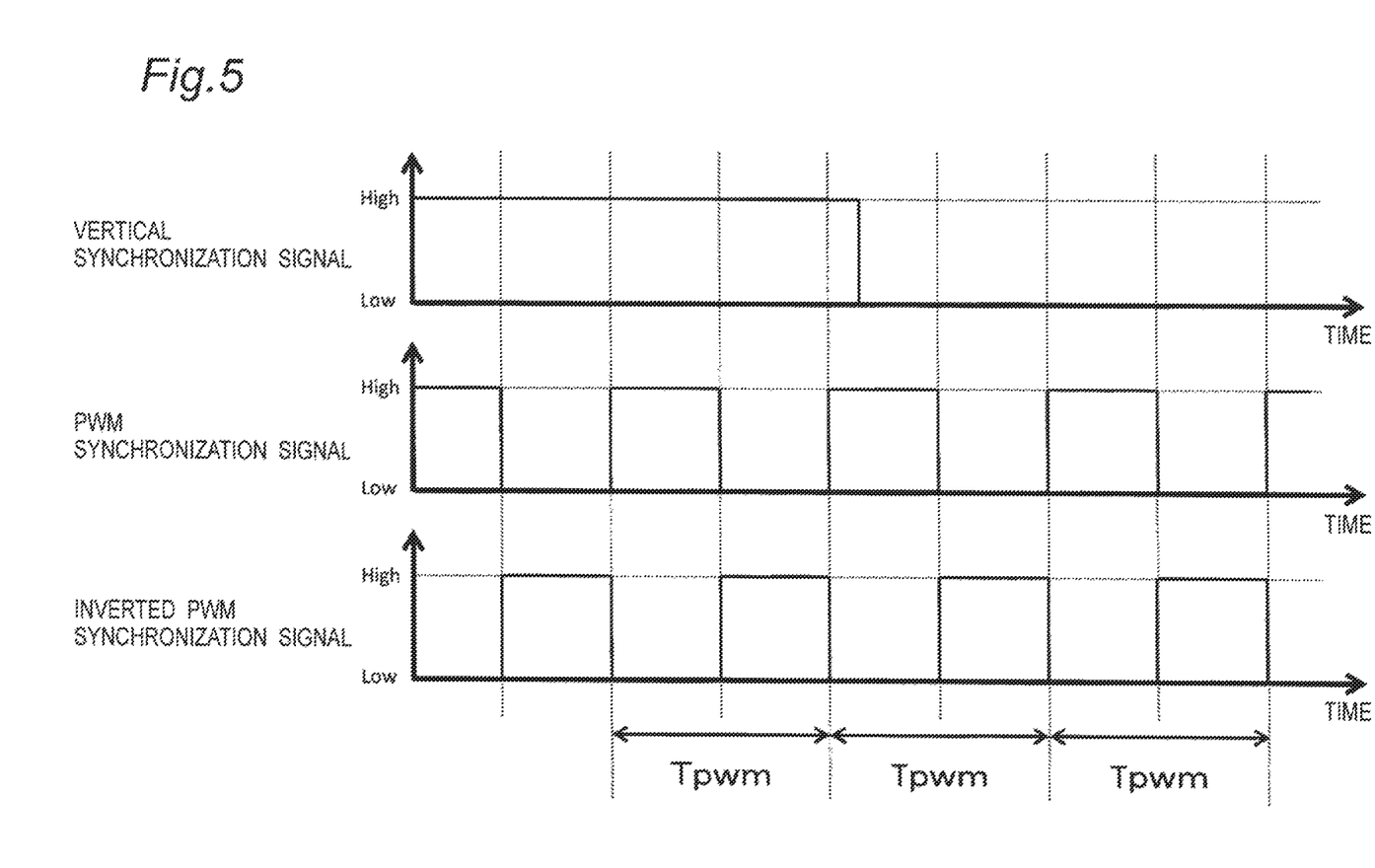
FIG. 5 is a timing chart showing an example of a waveform of a PWM (pulse width modulation) synchronization signal inputted into a power supply current control apparatus 200 at FIG. 2.

FIG. 5 is a timing chart showing an example of a waveform of the PWM synchronization signal inputted into the power supply current control apparatus 200 of FIG. 4. In FIG. 5, Tpwm denotes one cycle of the PWM synchronization signal. One cycle of the PWM synchronization signal is set to a very short interval such as 1/135,000 second.

The semiconductor light source control apparatus 20 emits blue laser light from the semiconductor light source 230. This blue laser light can be switched over to be turned on and off in units of a cycle Tpwm of the PWM synchronization signal, and the intensity of the light for a certain interval is determined by the ratio (duty) of the on-interval for that interval. The operation of the semiconductor light source control apparatus 20 will be described in detail later in Section 1-2-2.

The blue laser light from the semiconductor light source 230 is incident on the phosphor wheel 100. The rotation of the phosphor wheel is synchronized with the vertical synchronization signal and is set to rotate once in one sub-frame (180 rotations per second). As a result, during a blue (B) interval of one sub-frame, the blue laser light is transmitted through the transmission region 101 of the phosphor wheel 100 and is outputted as it is as blue light. In addition, for the other red (R) interval, green (G) interval, and yellow (Ye) interval, the blue laser light is converted into yellow light by the yellow region 102 of the phosphor wheel 100, and then, the yellow light is outputted.

The output light of the phosphor wheel 100 is uniformed by the rod integrator 110 and is then incident on the color wheel 120. The rotation of the color wheel 120 is synchronized with the rotation of the phosphor wheel 100, and the color wheel 120 rotates once while the phosphor wheel 100 rotates once.

For the green (G) interval of one sub-frame, the yellow light from the phosphor wheel 100 is converted into green light by the filter in the red filter region 121, and the green light is outputted. For the red (R) interval, the yellow light from the phosphor wheel 100 is converted into red light by the filter in the green filter region 122, and the red light is outputted. For the blue (B) interval, the blue Light transmitted through the phosphor wheel 100 passes through the transmission region 121 of the color wheel 120, and it is outputted as the blue light as it is. For the yellow (Ye) interval, the yellow light from the phosphor wheel 100 passes through the transmission region 131 of the color wheel 120, and is directly outputted as yellow light.

As thus described, for each color interval, the light of a color corresponding to that interval is outputted from the color wheel 120. The color light outputted from the color wheel 120 is modulated for each pixel by the DMD 130 based on the image signal and projected onto the screen by the projection lens 140.

1-2-2, Operation of Semiconductor Light Source Control Apparatus 20

The operation of the semiconductor light Source control apparatus 20 of FIG. 4 will be described below.

Referring to FIG. 4, the power supply current control apparatus 200 inputs a light source on/off signal from the external circuit, current value information of respective colors, timing pulses of respective colors, the PWM synchronization signal, a vertical synchronization signal, and an actual current value signal from the amplifier 250. The power supply current control apparatus 200 executes a current value control process of FIG. 7 to be described later in synchronization with the input vertical synchronization signal. Hence, the power supply current control apparatus 200 generates a current control signal to drive and control the DC/DC converter 210. In addition, the power supply current control apparatus 200 generates the PWM signal so that the duty value becomes equal to a duty value determined by the current value control process of FIG. 7, to control the light source current switch 220 to be turned on/off in synchronization with the PWM synchronization signal. However, the power supply current control apparatus 200 generates the PWM signal so that the PWM signal is always turned off while the input light source on/off signal is turned off.

The DC/DC converter 210 generates a current that is to flow in the semiconductor light source 230 in accordance with the current control signal from the power supply current control apparatus 200. At this time, the DC/DC converter 210 is controlled with a current value determined by the current value control process and thus generates a current, so that the current flowing in the semiconductor light source 230 becomes equal to a target current (amplitude) value. The light source current switch 220 switches over on/off of conduction in accordance with the PWM signal from the power supply current control apparatus 200. Hence the conduction/disconnection of the current from the DC/DC converter 210 to the semiconductor light source 230 is switched over.

The semiconductor light source 230 is, for example, a blue laser light source and emits blue laser light with an intensity corresponding to a value of a flowing current. A current generated by the DC/DC converter 210 and subjected to on/off modulation by the light source current switch 220 is allowed to flow in the semiconductor light source 230, so that the output light of the semiconductor light source 230 is pulse-width-modulated (PWM). The detection resistor 240 generates a detection voltage with the current flowing in the semiconductor light source 230. Since this detection voltage is usually a small value (for example, several mV), the detection voltage is difficult to detect and reflect accurately as it is. Therefore, the amplifier 250 amplifies the detection voltage generated by the detection resistor 240, and outputs the amplified voltage to the power supply current control apparatus 200 as an actual current value signal.

A typical technique for driving and controlling the DC/DC converter 210 so that the current flowing in the semiconductor light source 230 is equal to the current value information of the color indicated by the timing pulse is as follows. That is, in the power supply current control apparatus 200, when the target current (amplitude) value does not match the current value indicated by the actual current value signal, the output of the DC/DC converter 210 is increased or decreased so as to correct the no-matching state. However, in this method, the waveform of the current that actually flows in the semiconductor light source 230 is a waveform with a rounded and inclined rising edge, and therefore, when the duty value of the PWM signal is changed at the timing of each color, the amplitude changes accordingly, In order to keep the amplitude constant, it is necessary to change the control of the DC/DC converter 210 for each color interval with a different duty value. However, when the duty is small, stable control at high speed is difficult due to a problem such as a delay in the response of the amplifier 250 or the response of the entire feedback control system. Further, as described above, the waveform of the current flowing in the semiconductor light source 230 is a waveform with a rounded rising edge. Accordingly, when the duty is a small value, the DC/DC converter 210 is controlled to increase the output so as to adjust the current value to the target value. As a result, when the duty value suddenly increases at the boundary of the color intervals or the like, excessive power may be outputted to the semiconductor light source 230. This is not preferable because in general, a semiconductor light source may be damaged when a current exceeding a rated current value flows. In addition, when the output of the DC/DC converter 210 is changed at the boundary of the color intervals, a vibration phenomenon may occur in which the waveform of the current flowing in the semiconductor light source 230 is undulated. This is not preferable because of causing deterioration in image quality and reliability.

In the semiconductor light source control apparatus 20 according to the present disclosure, the output of the DC/DC converter is controlled only for the green G) interval. Among from the intensity of each color light required for synthesizing white light, the intensity of the green light is largest. Therefore, the duty value of the PWM signal is also maximized for the green (G) interval. For the other intervals where the duty value is smaller, the brightness of the output light is controlled only by the ratio of the duty value to the green interval. This eliminates the need to control the brightness for an interval having a small duty, enabling easy and stable control of the current flowing in the semiconductor light source 230.

However, since the amplitude of the current flowing in the semiconductor light source 230 changes in accordance with the change in the duty value, the ratio of the current values of the input colors cannot be directly used as the duty value ratio and needs to be corrected. This is solved by compensating for the decrease in the output corresponding to the decrease in amplitude by increasing the duty. By increasing the duty with a decrease in the ratio of the duty value to the green (G) interval, a correct output can be produced.

Figure 6:
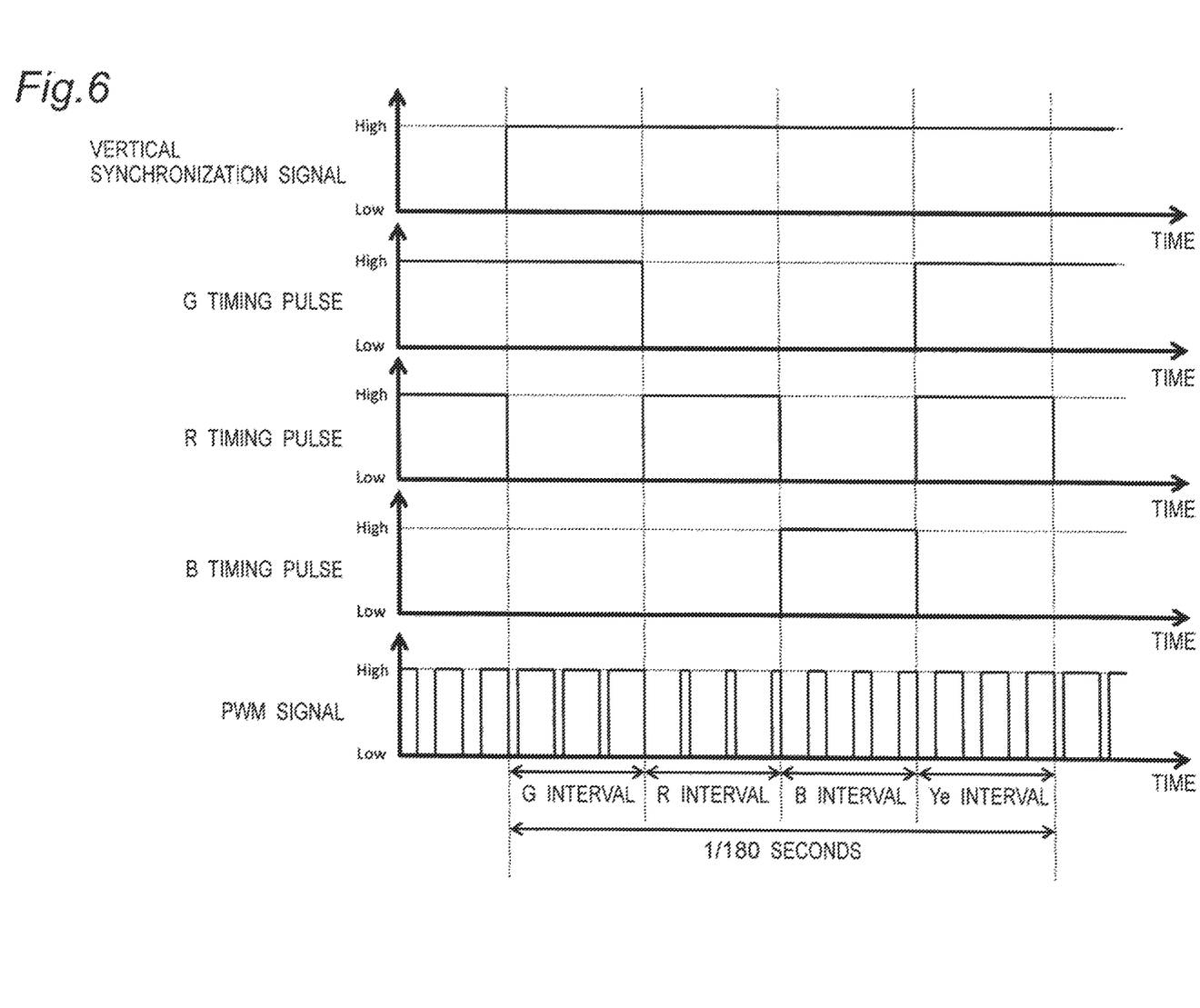
FIG. 6 is a timing chart showing an example of waveforms of a vertical synchronization signal, timing pulses of respective colors, and the PWM signal in the power supply current control apparatus 200 of FIG. 2.

FIG. 6 is a timing chart showing an example of waveforms of a vertical synchronization signal, timing pulse of respective colors, and the PWM signal in the power supply current control apparatus 200 of FIG. 4. Each color interval is indicated by a timing pulse of each color. However, it is indicated that for the yellow (Ye) interval, both the green (G) and red (R) timing pulses are High level. In addition, it can be seen that the PWM signal has the largest duty value for the green (G) interval.

Figure 7:
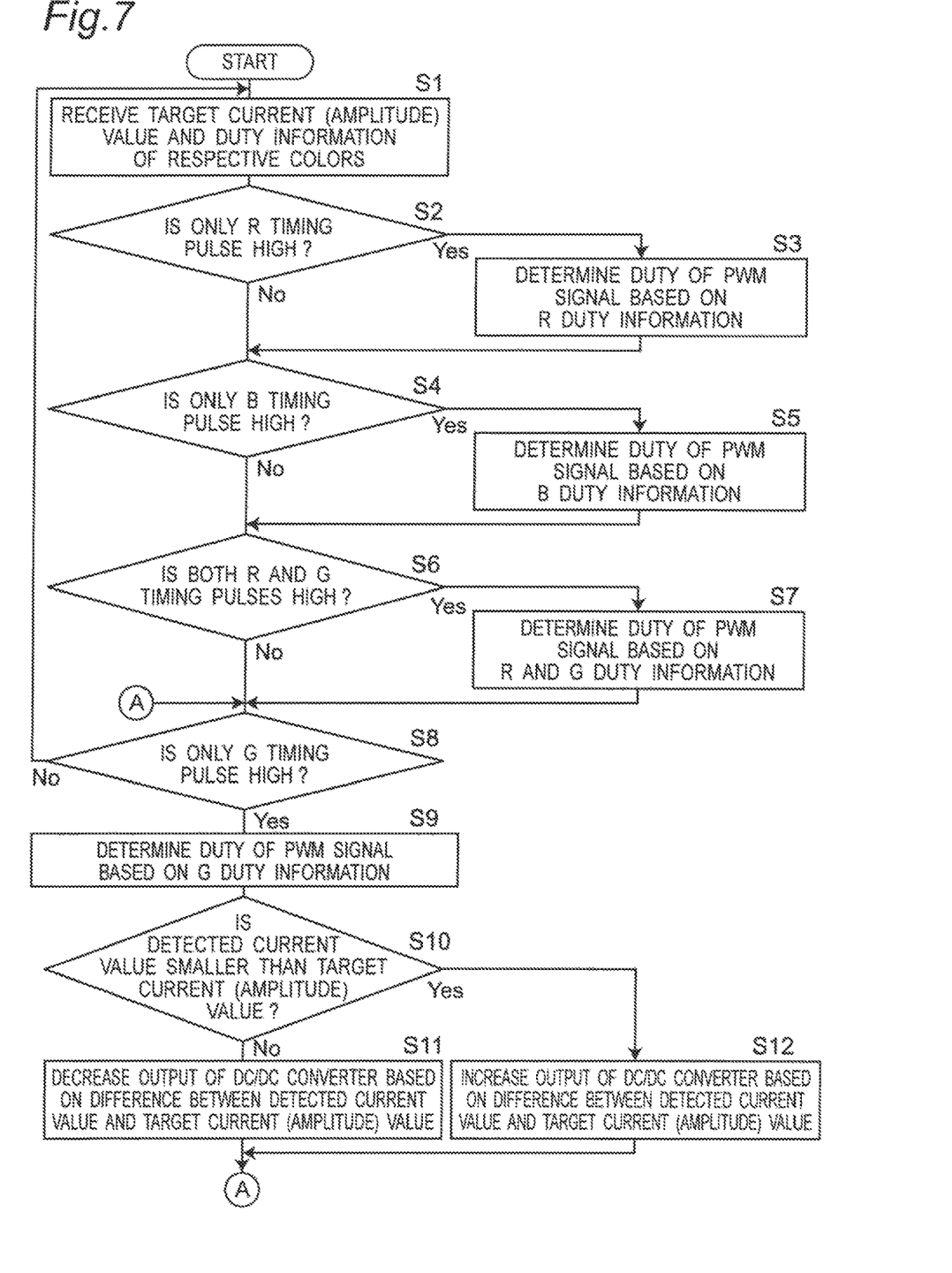
FIG. 7 is a flowchart for describing operation of a current value control process in the power supply current control apparatus 200 of FIG. 2.

FIG. 7 is a flowchart showing an example of the operation of the power supply current control apparatus 200 of FIG. 4.

First of all, in step S1, the target current (amplitude) value and the duties of respective colors are received from the outside. In step S2, it is determined whether or not only the red (R) timing pulse is High level, that is, whether or not the present interval is the red (R) interval. If Yes in step S2, the process proceeds to step S3. On the other hand, if No in step S2, the process proceeds to step S4. In step S3, the duty value of the PWM signal is determined based on the input red (R) duty information.

In step S4, in a manner similar to that of step S2, it is determined whether or not the present interval is the blue (B) interval. If Yes in step S4, the process proceeds to step S5. On the other hand, if No in step S4, the process proceeds to step S6. In step S5, the duty value of the PWM signal is determined based on the input blue (B) duty information in a manner similar to that of step S3.

In step S6, it is determined whether or not both the red (R) timing pulse and the green (G) timing pulse are High level, that is, whether or not the present interval is the yellow (Ye) interval. If Yes in step S6, the process proceeds to step S7. On the other hand, if No in step S6, the process proceeds to step S8. In step S7, the duty value of the PWM signal is determined based on the input red (R) duty information and green (G) duty information. The value may be determined based, for example, on an average value of red (R) duty information and green (G) duty information.

In step S8, it is determined whether or not only the green (G) timing pulse is High level, that is, whether or not it is the green (G) interval at the present. If Yes in step S8, the process proceeds to step S9. On the hand, if No in step S8, the operation is repeated from step S1. In step S9, the duty value of the PWM signal is determined based on the input green (G) duty information.

In step S10, it is determined whether or not the detection current value indicated by the actual current value signal inputted from amplifier 250 is smaller than the target current (amplitude) value. When the target current (amplitude) value is smaller than or equal to the detection current value (No in step S10), the process proceeds to step S11, and the output of the DC/DC converter 210 is decreased based on the difference between the detection current value and the target current (amplitude) value. On the other hand, when the detection current value is smaller than the target current (amplitude) value (Yes in step S10), the process proceeds to step S12, and the output of the DC/DC converter 210 is increased based on the difference between the detection current value and the target current (amplitude) value. When the correction process in step S11 or step S12 is completed, the process returns to step S8.

1-3. Advantageous Effects Etc.

As described above, in the present embodiment, the projection type image display apparatus 10 includes the semiconductor light source control apparatus 20, the phosphor wheel 100, the color wheel 120, the DMD 130, and the projection lens 140. The semiconductor light source control apparatus 20 emits the blue laser light from the semiconductor light source 230. The phosphor wheel 100 and the color wheel 120 color-convert the blue laser light from the semiconductor light source 230 in synchronization with a vertical synchronization signal. The DMD 130 modulates the color-converted image light for each pixel in accordance with an image signal. The projection lens 140 projects the modulated image light onto the screen.

In addition, the semiconductor light source control apparatus 20 includes the power supply current control apparatus 200, the DC/DC converter 210, the light source current switch 220, the semiconductor light source 230, the detection resistor 240, and the amplifier 250. The power supply current control apparatus 200 controls the output of the DC/DC converter so that, only for the green (G) interval, a value of a current flowing in the semiconductor light source 230 is equal to current value information inputted externally.

In addition, the power supply current control apparatus 200 drives and controls the light source current switch 220 in synchronization with a PWM synchronization signal. The semiconductor light source 230 emits the blue laser light by allowing passage of a current. The detection resistor 240 generates a detection voltage with the current flowing in the semiconductor light source 230. The amplifier 250 amplifies the detection voltage, and outputs the amplified signal to the power supply current control apparatus 200 as an actual current value signal.

As a result, the number of parameters used for controlling the current value to match the target value decreases, and the time width of the current used for feedback increases. Therefore, the control of the current flowing in the semiconductor light source 230 is facilitated. Further, a plurality of problems caused by the change in the output of the DC/DC converter at the boundary of the color intervals are solved, thus enabling stable and highly reliable drive of the light source.

Other Embodiments

As described above, the first embodiment has been described as an example of the technique disclosed in the present application. However, the technique in the present disclosure is not limited to this and can also be applied to embodiments in which changes, substitutions, additions, omissions, and the like have been made as appropriate. In addition, it is also possible to combine the constituent elements described in the first embodiment to form a new embodiment.

Therefore, another embodiment will be exemplified below.

In the first embodiment, the combination of the red (R) light, the green (G) light, the blue (B) light, and the yellow (Ye) light has been described as an example of color light for synthesizing the white light. However, it is only necessary that the white light is synthesized. Therefore, for example, a combination of three colors of light, which are the red (R) light, the green (G) light, and the blue (B) light, may be used.

In addition, in the first embodiment, the green (G) light has been, described as an example of color light having the maximum duty value. However, when the white light is synthesized by a combination of other color lights as described above, the duty value other than the green (G) light may be maximized. In that case, the current control may be done for an interval corresponding to the color.

Further, in the first embodiment, the combination of the phosphor wheel 100 and the color wheel 120 has been described as an example of means for color-converting the blue laser light. However, these are only required to convert the light into a color corresponding to each interval and may, for example, be a single phosphor wheel including a red phosphor, a green phosphor, and a yellow phosphor.

As described above, the embodiments have been described as the illustration of the technique in the present disclosure. To that end, the accompanying drawings and detailed description have been provided.

Accordingly, some of the constituent elements described in the accompanying drawings and the detailed description can include not only constituent elements essential for solving the problems, but also constituent elements not being essential for solving the problems but provided for illustrating the above technique. For this reason, these nonessential constituent elements should not be recognized as essential as soon as these nonessential constituent elements are described in the accompanying drawings and detailed description.

In addition, since the above embodiments have been provided for illustrating the technique in the present disclosure, if is possible to make various changes, substitutions, additions, omissions, or the like within the scope of claims or the equivalent thereof.

The present disclosure is applicable to a projection type image display apparatus that converts light from a semiconductor light source into the light of respective colors and projects the converted light. Specifically, the present disclosure is applicable to a projector or the like.

What is claimed is:

1. A semiconductor light source control apparatus comprising:
   a semiconductor light source that emits light in accordance with a current;
   a detection resistor that generates a detection voltage by the current flowing in the semiconductor light source; and
   a power supply current control apparatus that controls the current flowing in the semiconductor light source based on the detection voltage and timing pulses for respective ones of a plurality of color intervals,
   wherein the semiconductor light source control apparatus pulse-width-modulates (PWM) the current flowing in the semiconductor light source for respective ones of the plurality of color intervals to adjust brightness and color tone of output light from the semiconductor light source, and
   wherein an amplitude of the current flowing in the semiconductor light source is feedback-controlled by the power supply current control apparatus only in a predetermined color interval when a duty value of the PWM is maximum so that the amplitude of the current flowing in the semiconductor light source becomes a target value, and the feedback control is not performed in the plurality of color intervals other than the predetermined color interval.

2. The semiconductor light source control apparatus as claimed in claim 1,
   wherein the plurality of color intervals include a green interval, and
   wherein the predetermined color interval when the duty value of the PWM is the maximum is the green interval.

3. A projection type image display apparatus comprising a
   semiconductor light source control apparatus,
   wherein the semiconductor light source control apparatus comprises:
      a semiconductor light source that emits light in accordance with a current;
      a detection resistor that generates a detection voltage by the current flowing in the semiconductor light source; and
      a power supply current control apparatus that controls the current flowing in the semiconductor light source based on the detection voltage and timing pulses for respective ones of a plurality of color intervals,
      wherein the semiconductor light source control apparatus pulse-width-modulates (PWM) the current flowing in the semiconductor light source for respective ones of the plurality of color intervals to adjust brightness and color tone of output light from the semiconductor light source, and
      wherein an amplitude of the current flowing in the semiconductor light source is feedback-controlled by the power supply current control apparatus only in a predetermined color interval when a duty value of the PWM is maximum so that the amplitude of the current flowing in the semiconductor light source becomes a target value, and the feedback control is not performed in the plurality of color intervals other than the predetermined color interval.

* * * * *